US012612309B2

(12) United States Patent
Helmle et al.

(10) Patent No.: US 12,612,309 B2
(45) Date of Patent: Apr. 28, 2026

(54) INTEGRATED METHOD FOR THE COMMERCIAL AND INDUSTRIAL UTILISATION OF CALCIUM SULPHATE WHILST OBTAINING RARE EARTH ELEMENTS FROM THE PRODUCTION OF PHOSPHORIC ACID

(71) Applicants: thyssenkrupp Industrial Solutions AG, Essen (DE); thyssenkrupp AG, Essen (DE)

(72) Inventors: Stefan Helmle, Hamm (DE); Peter Stockhoff, Dorsten (DE); Nicolai Daheim, Beckum (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 887 days.

(21) Appl. No.: 17/791,837

(22) PCT Filed: Jan. 5, 2021

(86) PCT No.: PCT/EP2021/050036
§ 371 (c)(1),
(2) Date: Jul. 8, 2022

(87) PCT Pub. No.: WO2021/140077
PCT Pub. Date: Jul. 15, 2021

(65) Prior Publication Data
US 2023/0039227 A1 Feb. 9, 2023

(30) Foreign Application Priority Data
Jan. 8, 2020 (DE) .................... 10 2020 100 249.1

(51) Int. Cl.
*C01B 17/74* (2006.01)
*C01B 25/232* (2006.01)
(Continued)

(52) U.S. Cl.
CPC ............ *C01B 17/74* (2013.01); *C01B 25/232* (2013.01); *C01F 11/08* (2013.01); *C01F 11/468* (2013.01);
(Continued)

(58) Field of Classification Search
CPC ..... C01B 17/74; C01B 25/232; C01B 17/506; C01F 11/08; C01F 11/468; C04B 7/04;
(Continued)

(56) References Cited

U.S. PATENT DOCUMENTS

| 2,222,740 A | 11/1940 | Ferdinand |
| 2,528,103 A | 10/1950 | Willson |

(Continued)

FOREIGN PATENT DOCUMENTS

| AN | 2009-S54348 | 6/2008 |
| AT | 284701 B | 9/1970 |

(Continued)

OTHER PUBLICATIONS

Machine Translation of CN 101486536 A (Year: 2025).*

(Continued)

*Primary Examiner* — Coris Fung
(74) *Attorney, Agent, or Firm* — thyssenkrupp North America, LLC

(57) ABSTRACT
A process may involve treating calcium sulfate separated from phosphoric acid with acid to obtain a suspension comprising purified calcium sulfate, separating the purified calcium sulfate in solid form from a liquid phase of the suspension, treating the purified calcium sulfate with water or with a salt- and/or chelate ligand-containing aqueous solution to leach rare earths out of the calcium sulfate, separating the further-purified calcium sulfate in solid form from the liquid phase of the suspension, mixing the purified calcium sulfate that is separated off with admixtures and (Continued)

reducing agents to obtain a raw meal mixture for cement clinker production, burning the raw meal mixture to obtain the cement clinker and thereby forming sulfur dioxide as offgas, and feeding the sulfur dioxide as raw material to sulfuric acid production to produce the sulfuric acid.

18 Claims, 3 Drawing Sheets

(51) Int. Cl.

| | |
|---|---|
| *C01F 11/08* | (2006.01) |
| *C01F 11/46* | (2006.01) |
| *C04B 7/04* | (2006.01) |
| *C04B 11/26* | (2006.01) |
| *C22B 3/06* | (2006.01) |
| *C22B 59/00* | (2006.01) |

(52) U.S. Cl.
CPC ................ *C04B 7/04* (2013.01); *C04B 11/26* (2013.01); *C22B 3/065* (2013.01); *C22B 59/00* (2013.01)

(58) Field of Classification Search
CPC ......... C04B 11/26; C22B 3/065; C22B 59/00; C22B 3/02; C22B 3/165; Y02P 10/20; Y02P 40/10
See application file for complete search history.

(56) References Cited

U.S. PATENT DOCUMENTS

| | | | |
|---|---|---|---|
| 2,531,977 | A | 11/1950 | Hammaren et al. |
| 3,260,035 | A | 7/1966 | Wheelock |
| 3,547,581 | A | 12/1970 | Muller et al. |
| 3,607,036 | A | 9/1971 | Foecking |
| 3,652,308 | A | 3/1972 | Stich et al. |
| 3,717,489 | A | 2/1973 | Herzog et al. |
| 3,984,525 | A | 10/1976 | Williams et al. |
| 4,312,842 | A | 1/1982 | Wilson, Sr. et al. |
| 4,362,705 | A | 12/1982 | Weterings |
| 4,388,292 | A | 6/1983 | Palmer et al. |
| 4,415,543 | A | 11/1983 | Wilson, Sr. et al. |
| 4,588,470 | A | 5/1986 | Abegglen |
| 4,588,570 | A | 5/1986 | Davister et al. |
| 4,608,238 | A | 8/1986 | Wilson, Sr. et al. |
| 4,797,265 | A | 1/1989 | Inoue et al. |
| 5,626,667 | A | 5/1997 | Ohle |
| 5,842,853 | A | 12/1998 | Bohle |
| 6,391,107 | B1 | 5/2002 | Reimann et al. |
| 6,551,428 | B1 | 4/2003 | Guillou et al. |
| 8,470,270 | B2 | 6/2013 | Abramov et al. |
| 9,631,258 | B2 | 4/2017 | Genkin et al. |
| 10,041,147 | B2 * | 8/2018 | Abramov ................ C22B 7/007 |
| 10,105,648 | B2 | 10/2018 | Rohloff et al. |
| 2016/0040268 | A1 * | 2/2016 | Genkin .................... C22B 3/06 |
| | | | 75/392 |
| 2019/0322540 | A1 | 10/2019 | Henry et al. |

FOREIGN PATENT DOCUMENTS

| | | | |
|---|---|---|---|
| AT | 292539 | T | 4/2005 |
| BE | 818 062 | A | 1/1975 |
| CA | 828060 | A | 11/1969 |
| CA | 886485 | A | 11/1971 |
| CA | 2852131 | A1 | 5/2013 |
| CN | 1948131 | A | 4/2007 |
| CN | 101186284 | B | 5/2008 |
| CN | 101486536 | | 7/2009 |
| CN | 101486536 | A * | 7/2009 ........... C04B 11/007 |
| CN | 102502524 | A | 6/2012 |
| CN | 103466982 | A | 12/2013 |
| CN | 105859167 | A | 8/2016 |
| CN | 106977123 | A * | 7/2017 |
| CN | 101597687 | A | 12/2019 |
| DE | 19 12 183 | | 10/1970 |
| DE | 16 46 647 | C3 | 8/1971 |
| DE | 1671215 | A1 | 9/1971 |
| DE | 23 23 292 | A1 | 11/1974 |
| DE | 32 22 721 | C2 | 12/1983 |
| DE | 3622688 | A1 | 1/1988 |
| DE | 44 47 602 | A1 | 5/1996 |
| DE | 10118142 | A1 | 10/2002 |
| DE | 10252585 | A1 | 5/2004 |
| DE | 10344040 | A1 | 4/2005 |
| DE | 102012111217 | A1 | 5/2014 |
| DE | 102014108334 | A1 | 12/2015 |
| DE | 102017114831 | A1 | 1/2019 |
| EP | 0 041 761 | A1 | 12/1981 |
| EP | 0 044 120 | A1 | 1/1982 |
| EP | 0728713 | A2 | 8/1996 |
| EP | 1037005 | B1 | 9/2000 |
| EP | 2 455 502 | A2 | 5/2012 |
| EP | 2449328 | A1 | 5/2012 |
| EP | 2 771 280 | A1 | 9/2014 |
| EP | 3 020 468 | A1 | 5/2016 |
| GB | 120991 | A1 | 12/1918 |
| GB | 1007898 | A | 10/1965 |
| GB | 1128104 | A | 9/1968 |
| IN | 215676 | B | 4/2006 |
| JP | 2007-126328 | A | 5/2007 |
| RU | 2 296 723 | C2 | 1/2007 |
| RU | 2412265 | C1 | 2/2011 |
| RU | 2471011 | C1 | 12/2012 |
| RU | 2487834 | C1 | 7/2013 |
| RU | 2510186 | C1 | 3/2014 |
| RU | 2607862 | C1 * | 1/2017 |
| RU | 2630072 | C2 | 9/2017 |
| RU | 2708718 | C1 | 12/2019 |
| SU | 947032 | A1 | 7/1982 |
| SU | 1604730 | A1 | 11/1990 |
| WO | 2013/060689 | A1 | 5/2013 |
| WO | 2019/007838 | A1 | 1/2019 |
| WO | 2019-211196 | A1 | 11/2019 |
| WO | 2019-211202 | A1 | 11/2019 |
| WO | 2020/067856 | A1 | 4/2020 |

OTHER PUBLICATIONS

Machine Translation of CN 1069774123 A (Year: 2025).*
Machine Translation of RU 2607862 C1 (Year: 2025).*
Abouzeid, Abdel-Zaher M., "Physical and thermal treatment of phosphate ores—An overview", Int. J. Miner. Process, 85: 59-84 (2008).
Kandil et al., "Ammonium sulfate preparation from phosphogypsum waste", Journal of Radiation Research and Applied Sciences, 10: 24-33 (2017).
Hilton, Julian, "Phosphogypsum (PG): Uses and Current Handling Practices Worldwide", 25th Annual Lakeland FL, London UK, Regional Phosphate Conference, 53 pages (2010).
English Translation of International Search Report issued in PCT/EP2020/085400, dated Mar. 10, 2021.

* cited by examiner

INTEGRATED METHOD FOR THE COMMERCIAL AND INDUSTRIAL UTILISATION OF CALCIUM SULPHATE WHILST OBTAINING RARE EARTH ELEMENTS FROM THE PRODUCTION OF PHOSPHORIC ACID

CROSS REFERENCE TO RELATED APPLICATIONS

This application is a U.S. National Stage Entry of International Patent Application Serial Number PCT/EP2021/050036, filed Jan. 5, 2021, which claims priority to German Patent Application No. DE 10 2020 100 249.1, filed Jan. 8, 2020, the entire contents of both of which are incorporated herein by reference.

FIELD

The present disclosure generally relates to plants and integrated processes for producing sulfuric acid and cement clinker and for obtaining rare earths using calcium sulfate formed in phosphoric acid production.

BACKGROUND

Calcium sulfate is a waste product from the phosphoric acid-producing industry and is obtained in the form of the dihydrate and/or hemihydrate in the digestion of phosphate ores with sulfuric acid. The calcium sulfate formed in the production of phosphoric acid is also referred to as phosphogypsum.

As a result of impurities such as phosphorus, fluorine, radioactive components and heavy metals in the calcium sulfate from phosphoric acid production, options are nowadays limited for use of the calcium sulfate, for example as cement admixture, fertilizer, mortar or road building material, and so only 15% of global annual calcium sulfate production from phosphoric acid production is used as such. The remaining 85% of annual calcium sulfate production is either stockpiled or dumped in the ocean.

On account of the current environmental situation, repositories for deposition of the phosphogypsum or dumping of phosphogypsum in the ocean are either permitted only under stricter regulations or not permitted at all.

The phosphogypsum quality achieved from the phosphoric acid process is dependent on factors such as raw phosphate used and process conditions in the digestion of the raw phosphate with sulfuric acid.

The processed raw phosphate can be used for phosphogypsum production by the following processing methods via the possible phosphoric acid processes: 1. calcination, 2. flotation, 3. conversion to monocalcium phosphate or dicalcium phosphate with the aid of inorganic acids. The processes mentioned are known to the person skilled in the art and are described, for example, in Physical and thermal treatment of phosphate ores—An overview; Int. J. Miner. Process. 85 (2008) 59-84; Abdel-Zaher M. Abouzeid; The Fertilizer Manual 3rd Edition; published by UNIDO & IFDC, 1998 edition; ISBN: 0792350324 9780792350323; and Pyroprocessing for the minerals industry; Thyssenkrupp Polysius; identifier: 1625/D (1.0 12.11 Stu) Printed in Germany.

For every metric tonne of phosphoric acid produced, according to the production method, 4 to 5 tonnes of calcium sulfate are produced. On account of the naturally different qualities/compositions of the phosphate ores and different process parameters for production of phosphoric acid, correspondingly different qualities of calcium sulfonates are also produced.

The elevated demands for handling of the calcium sulfate or phosphogypsum produced present complex challenges to the phosphoric acid-producing industry. Estimates for the storage of phosphogypsum for life are as high as 25 dollars/t of gypsum for the producing companies.

One example of possible commercial and industrial-scale use of calcium sulfate/phosphogypsum which is discussed many times in the literature is the conversion of phosphogypsum to cement clinker or cement and $SO_2$ or sulfuric acid. The conversion of gypsum and phosphogypsum to cement and sulfuric acid by the Müller-Kühne process or by the OSW-Krupp process have long been known; see, for example, patent specifications AT 284701 B or AT 292539 B.

DE 3222721 C2 describes, on the basis of the Müller-Kühne process, an improved method resulting from upstream partial dewatering of the gypsum by centrifuging with subsequent two-stage drying, wherein the $SO_2$-containing offgas exiting from the first drying stage is introduced directly into the gas scrubber of the sulfuric acid plant. The method described does not make any reference to quality of the phosphogypsum with regard to particular components, nor any reference to the quality of the $SO_2$ offgas for the downstream sulfuric acid plant indicated.

Kandil et al., Journal of Radiation Research and Applied Sciences; 10; 2017, described a process for production of ammonium sulfate from phosphogypsum, in which, in a first step, sulfuric acid is used to leach out $P_2O_5$, F, lanthanides and further constituents. The process described has no association with the conversion of phosphogypsum to cement clinker and sulfuric acid.

EP 0041761 A1 relates, in association with the conversion of phosphogypsum to cement clinker and $SO_2$ gas, exclusively to the recrystallization of calcium sulfate dihydrate to calcium sulfate anhydrite. It is possible to achieve $P_2O_5$ contents of less than 0.01% by weight and fluorine contents of less than 0.05% by weight in the calcium sulfate anhydrite. Calcium components and sulfur dioxide can be obtained at high temperatures from the anhydrite thus obtained. The possibility of recycling spent sulfuric acid into the phosphoric acid process is mentioned, but influencing factors such as grain size of the gypsum and solids to liquid ratio (S/L) that directly affect the water balance in the phosphoric acid complex are not taken into account.

GB 120991 describes the production of cement by the Müller-Kühne process based on calcium sulfate hemihydrate which is produced by recrystallization of calcium sulfate dihydrate in phosphoric acid production. Nowadays, this type of process is known as the DHH (dihydrate-hemihydrate) process. Additionally described is the production of sulfuric acid and portland cement on the basis of the hemihydrate. There is no description of treatment of the calcium sulfate with an acid after separation from the phosphoric acid.

U.S. Pat. No. 3,547,581 relates to a method of processing filtered gypsum from phosphoric acid production, in which the gypsum, after addition of silica and sulfuric acid, is heated up to temperatures of 200° C. to 400° C. and calcined to hemihydrate or anhydrite. The product obtained is washed with water, which can reduce the contents of phosphate and fluoride in the gypsum. On account of the high temperatures required, this is an energy intensive process which comprises a multitude of process steps. Moreover, the method according to U.S. Pat. No. 3,547,581 requires the heating and addition of silica, as compared with the process concept of the invention as presented here. There is no description of production of a suspension by addition of acid to calcium sulfate.

DE 1671215 relates to a process for producing sulfuric acid and cement from waste calcium sulfate, such as phosphogypsum, which discusses the production of the raw meal.

DE 1912183 describes a process for producing low-fluorine cement clinker from phosphogypsum, in which the fluorine in the phosphogypsum is selectively reduced by heating the waste gypsum in the finely ground state to temperatures between 500 and 900° C.

U.S. Pat. No. 4,415,543 describes a process in which the content of fluoride and phosphates in phosphogypsum is reduced by washing with water, followed by heating.

In general, the literature merely describes the respective individual processes such as processing of the phosphogypsum, thermal breakdown of the phosphogypsum to cement clinker and sulfur dioxide. There are only isolated mentions of possible associations with upstream and/or downstream processes.

It has additionally been found that not insignificant amounts of rare earths are present in the calcium sulfate.

Rare earths (commonly abbreviated to RE) is understood to mean a collective term for the elements scandium (atomic number 21), yttrium (39) and lutetium (71), and the fourteen lanthanoids lanthanum (57), cerium (58), praseodymium (59), neodymium (60), promethium (61), samarium (62), europium (63), gadolinium (64), terbium (65), dysprosium (66), holmium (67), erbium (68), thulium (69) and ytterbium (70), which were formerly known as lanthanides. The rare earths scandium, yttrium and lutetium are in the 3rd group in the Periodic Table and are among the transition metals. Lanthanoids is the group name for lanthanum and the 13 elements of the rare earth metals that follow lanthanum with atomic numbers of 58 to 70.

Rare earths are used in many key technologies. Europium was required, for example, in cathode ray tube and plasma screens for the red component in the RGB color space. Neodymium is used, inter alia, in an alloy with iron and boron for production of permanent magnets, and these neodymium magnets are used in permanently excited electric motors, generators of wind turbines and also in electric motors such as hybrid power units for motor vehicles. Lanthanum is required, for example, for alloys in accumulators. Rare earth metals are also used in glazes, in the production of specialty glasses, and in medical diagnostics radiology as contrast agent admixture in MRI examinations.

In the context of the further processing of the calcium sulfate obtained and the significance of rare earths, there is therefore a need to recover the rare earths from the calcium sulfate.

The recovery of rare earths from calcium sulfate obtained in phosphoric acid production is known in principle.

For instance, CN101186284 B discloses a process for extracting rare earths from the phosphogypsum from a phosphoric acid plant. This involves leaching the phosphogypsum obtained from the phosphoric acid plant with sulfuric acid having a concentration between 5% and 30% (corresponding to ~0.5-3.7 M $H_2SO_4$) and temperatures between 20 and 90° C. The sulfuric acid solution is subsequently admixed with potassium, sodium or ammonium ions and an "inorganic acid salt" in order to produce sparingly soluble double salts of the rare earths, which can subsequently be filtered off and processed further.

CN101597687A discloses a process wherein phosphogypsum from a phosphoric acid plant is leached with sulfuric acid. After filtration, the filtrate is concentrated to 35-40% (~4.5-5 M) by addition of further concentrated sulfuric acid. The lanthanide-containing solution formed is subsequently admixed with an about 100-fold excess of $CaCl_2$, in order to convert the lanthanides as readily soluble chlorides to solution or leave them in solution.

EP 2 455 502 A2 describes a combined process composed of extraction of the rare earths by means of a sulfuric acid-nitric acid mixture and simultaneous use of ultrasound. The suspension of phosphogypsum and acid solution is subsequently filtered, and the rare earths are extracted by means of ion exchangers.

In the process described in RU2487834, phosphogypsum is admixed with a dilute sulfuric acid and stirred at low temperatures. After filtration, the filtrate thus obtained is admixed with oxalic acid and brought to a pH of 0.9-2.5 by means of ammoniacal solution. This precipitates the oxalates of the lanthanides as a saleable product.

In the process described in RU2610186, a mixture of phosphoric acid (25%) and sulfuric acid (15%) is admixed with phosphogypsum and stirred. After 1 h, the suspension is filtered and the moist phosphogypsum is admixed with water, stirred again for 15 min. and filtered. The filtrates are then passed together through a combination of cation and anion exchangers.

U.S. Pat. No. 4,312,842 A discloses a process for preparing phosphoric acid comprising the recovery of by-products. EP 2 455 502 A2 discloses a method of extracting rare earth elements from phosphogypsum. Database WPI, Week 201002, Thomson Scientific, London, GB: AN 2009-S54348 XP002802306. CN 101 597 687 A, Dec. 9, 2009, discloses a method of transformation of rare earth sulfates from phosphogypsum. U.S. Pat. No. 9,631,258 B2 discloses a process for extraction of rare earths from phosphogypsum hemihydrate.

These known processes have the disadvantage that the rare earths are leached directly in a first step, the yield being described as moderate to poor for lanthanides after leaching with sulfuric acid or sulfuric acid-nitric acid mixtures. By contrast with the known processes, in the present process, the rare earths, in a first step, are first converted to sparingly soluble salts, removed in solid form, and leached only in a second step.

DETAILED DESCRIPTION

Figure 1:
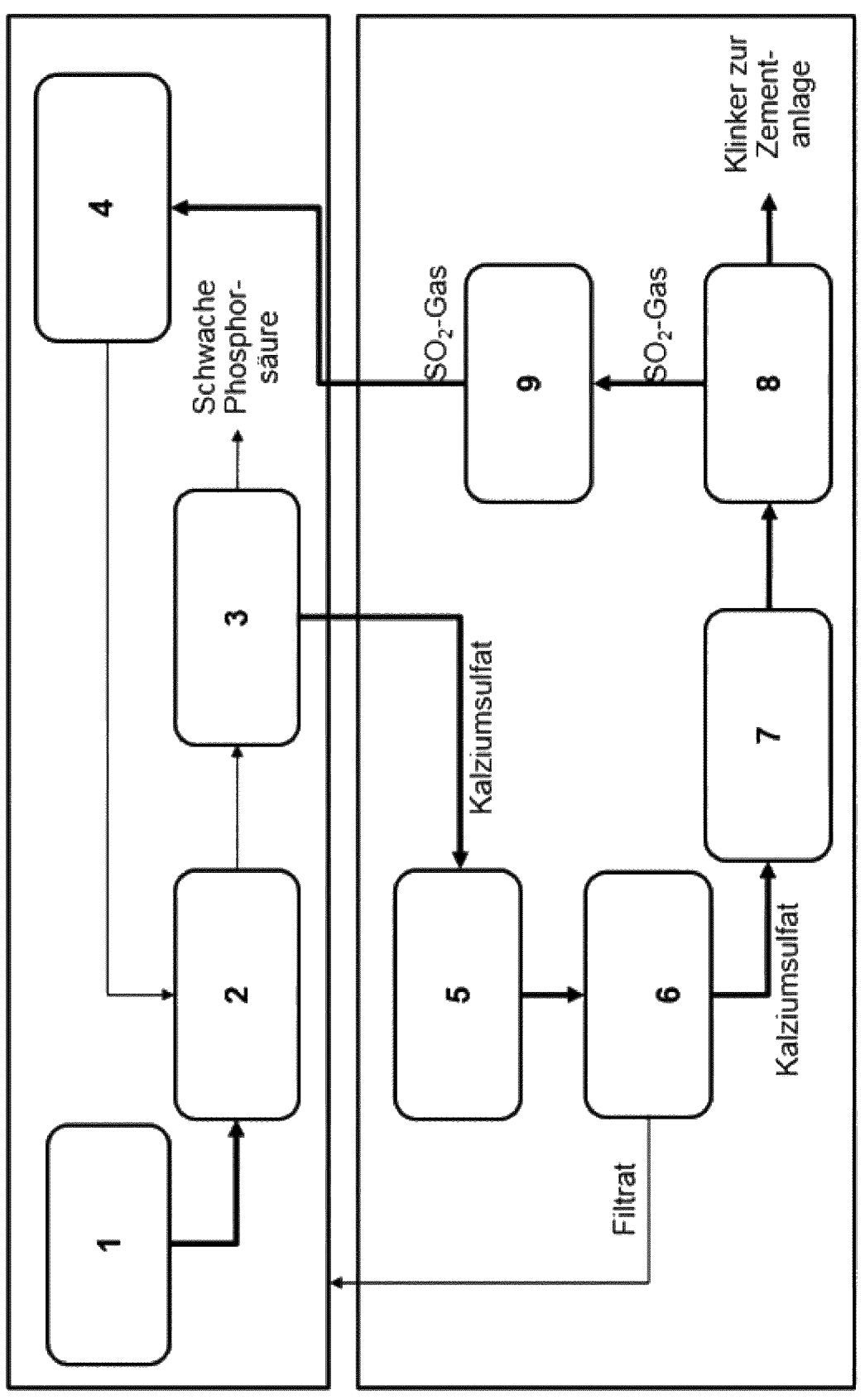
FIG. 1 is a schematic flow diagram for utilization of calcium sulfate from phosphoric acid production with the aid of an integrated complex for production of cement clinker and sulfuric acid.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide a method of using calcium sulfate (phosphogypsum) formed in phosphoric acid production for production of products of value, which can be used on an industrial scale in order to meet environmental and economic demands.

Another example object of the present disclosure is to provide a method of obtaining rare earths from the calcium sulfate (phosphogypsum) formed in phosphoric acid production, which is notable for a maximum yield of rare earths with maximum purity.

In some examples, a process for producing sulfuric acid and cement clinker and for obtaining rare earths using calcium sulfate which is formed and separated off as a solid by-product in production of phosphoric acid in the reaction of raw phosphate with sulfuric acid to form phosphoric acid may comprise the following steps:

a) the calcium sulfate separated from the phosphoric acid is treated with an acid in order to obtain a suspension comprising purified calcium sulfate, b) the purified calcium sulfate is separated in solid form from the liquid phase of the suspension obtained, b1) the purified calcium sulfate obtained in step b) is treated with water or with a salt- and/or chelate ligand-containing aqueous solution, in order to leach the rare earths out of the calcium sulfate, b2) the further-purified calcium sulfate is separated in solid form from the liquid phase of the suspension obtained in step b1), with one or more rare earths present in the liquid phase, c) the purified calcium sulfate separated off is mixed with admixtures and reducing agents in order to obtain a raw meal mixture for cement clinker production, d) the raw meal mixture is burnt in order to obtain the cement clinker, with formation of sulfur dioxide as offgas, e) the sulfur dioxide formed is fed as raw material to sulfuric acid production in order to produce the sulfuric acid, it being possible to use the sulfuric acid produced as starting material in phosphoric acid production and/or send it to another use.

The process of the invention is especially an integrated process. The integrative approach as an overall concept from the phosphogypsum to the cement clinker and sulfur dioxide in the integrated process enables the balancing of the dependences/influencing factors for optimized process selection, combined with the associated flexibility of the process regime with the option of incorporation into existing phosphoric acid and sulfuric acid plant complexes. In this way, it is possible to achieve a mutual balance in all process parameters and process stages of the overall complex for achievement of specific product qualities proceeding from variable reactant characteristics, for example the reactant characteristics of the apatite used in phosphoric acid production or the phosphogypsum from current production or from the stockpile. This has not been considered to date. The combination of features of the integrative process of the invention cannot be derived from the prior art.

In this connection, the expressions "complex" and "plant" are used interchangeably hereinafter. The liquid phase separated off which is obtained in step b) can be introduced as feedstock into the reaction unit for phosphoric acid production.

Particular advantages of the process of the invention, especially of the integrated process, can include the following points:

1. Use of the calcium sulfate/phosphogypsum produced as raw material for production of products of value 2. Conversion of the calcium sulfate/phosphogypsum to cement clinker as raw material for cement production and sulfur dioxide as raw material for the sulfuric acid production 3. Reduction of the effects of calcium sulfate/phosphogypsum deposition and/or dumping on the environment 4. Recovery and circulation of the sulfuric acid used in the phosphoric acid process and/or further utilization, which merely gives rise to a need for additional sulfur for compensation of losses in the overall process. General embodiments are circulation of the sulfuric acid or utilization of phosphogypsum from stockpiles. In the latter case, it is necessary to export sulfuric acid since the supply of phosphogypsum from external sources, especially stockpiles, results in a sulfur excess in the overall process. Balancing of the sulfur budget is therefore necessary especially with regard to the circulation of sulfuric acid.

5. Increasing the yield of phosphorus from the raw phosphate, and hence better utilization of the raw phosphate used for the purpose of phosphoric acid production 6. Reduction in the $CO_2$ footprint through the use of calcium sulfate/phosphogypsum as raw material for cement clinker production 7. Integrative use of existing plant components of the phosphoric acid and sulfuric acid complex, and hence reduced additional capital costs The integrated process approach described here can be summarized in 6 categories of production processes:

Production of phosphogypsum of suitable quality for the cement clinker process by steps a) and b) of the process of the invention, Production of the raw meal mixture specific to the cement clinker process by step c) of the process of the invention, Production of the cement clinker by step d) of the process of the invention and optionally further processing of the cement clinker to cement, Production of sulfur dioxide gas with a quality suitable for the sulfuric acid process in step d) of the process of the invention, in which case the sulfur dioxide gas may need to be subjected to offgas cleaning before being supplied to step e), Production of the sulfuric acid in step e) of the process of the invention.

Recovery of rare earths in high yields with a high purity.

The process of the invention for production of sulfuric acid and cement clinker using calcium sulfate is preferably integrated into phosphoric acid production. Phosphoric acid production is the customary wet method in which raw phosphate is reacted/digested with sulfuric acid in order to form phosphoric acid (digestion phosphoric acid).

Crude phosphate used is sedimentary and magmatic phosphate rocks, which are generally processed prior to use. The processing typically comprises comminution and concentration with regard to the phosphate content. For processing, phosphate ore or phosphate rock, especially apatite-containing ore, can be subjected, for example, to a calcination, flotation and/or conversion to monocalcium phosphate or dicalcium phosphate with the aid of inorganic acids.

The production of phosphoric acid by the wet method is common knowledge to the person skilled in the art. General descriptions of the method can be found, for example, in Ullmann's Encyclopedia of industrial chemistry, 5th edition, 1991, vol. A19, "Phosphoric Acid and Phosphate", p. 465-505.

The phosphoric acid production plant preferably comprises a processing unit for phosphate rock, a reaction unit for the reaction of crude phosphate with sulfuric acid, and a filtration unit for removal of calcium sulfate. In general, the phosphoric acid production plant additionally comprises a sulfuric acid production plant, resulting in a phosphoric acid-sulfuric acid complex.

For the production of cement clinker and sulfuric acid by the process of the invention, it is possible, for example, to use calcium sulfate or phosphogypsum from the following existing processes that are known to the person skilled in the art for production of phosphoric acid: 1. dihydrate (DH) process, 2. hemihydrate (HH) process, 3. dihydrate-hemihydrate (DHH) process, 4. hemihydrate-dihydrate (HDH) process and 5. dihydrate attack-hemihydrate filtration (DA-HF) process.

One of the five processes above should be used for the present invention, there being recrystallization of the calcium sulfate in the case of processes 3. to 5. (DHH/HDH/DA-HF), which is not required for the process of the invention.

In the process of the invention, in step a), the calcium sulfate that has been obtained, for example, by one of the abovementioned five processes, after removal from phosphoric acid production, is treated with an acid, which increases the $P_2O_5$ yield.

The calcium sulfate removed from phosphoric acid production is thus preferably not subjected to any recrystallization before being fed to step a).

In the process for phosphoric acid production, the reaction of raw phosphate with sulfuric acid to form phosphoric acid forms calcium sulfate as a solid by-product which is separated from the phosphoric acid. The separation can be effected, for example, by centrifugation, filtration, settling or concentration, preference being given to mechanical separation. The solid calcium sulfate is preferably separated from phosphoric acid by filtration. The separation comprises or consists of the separation of the calcium sulfate formed from the phosphoric acid (product acid) (first separation), preferably by filtration. Depending on the process, the solid calcium sulfate (preferably filtercake) separated by the first separation is optionally subjected to one or more washes with liquid, especially with water, with subsequent removal, preferably by filtration, of the liquid.

The calcium sulfate separated from the phosphoric acid which is used in step a) may be the calcium sulfate obtained directly after the first separation from the phosphoric acid, since no further wash is necessarily required. This enables a reduction in the filter area in the phosphoric acid process. But the calcium sulfate separated from the phosphoric acid which is used in step a) may also be calcium sulfate which, after the first separation from the phosphoric acid, has been subjected to one or more washes with a liquid, preferably water, before being sent to step a).

Alternatively, it is possible to use stockpiled calcium sulfate from phosphoric acid production as the calcium sulfate which is used in step a). It may be necessary to subject the stockpiled calcium sulfate to additional mechanical pretreatment prior to use in step a). It is likewise possible to wash the stockpiled calcium sulfate prior to the use in step a) by means of one or more washes with a liquid, preferably water.

The reaction of raw phosphate with sulfuric acid takes place in the phosphoric acid production complex in the reaction unit of the phosphoric acid plant. The reaction mixture obtained is then conveyed to the separation unit, preferably filtration unit, of the phosphoric acid plant, where the phosphoric acid is separated from/filtered out of the calcium sulfate formed in one or more separation stages. The calcium sulfate for use in stage a) is taken from the separation unit or filtration unit, preferably from the first separation stage, and/or the calcium sulfate used in stage a) is stockpiled calcium sulfate from phosphoric acid production.

The calcium sulfate separated off which is used in step a) is preferably calcium sulfate in the form of dihydrate, hemihydrate or a combination thereof.

In step a) of the process of the invention, the calcium sulfate separated off from phosphoric acid production is treated with an acid. The acid is added to the calcium sulfate in order to perform the treatment. In this way, after the treatment, a suspension comprising purified calcium sulfate is obtained. The suspension obtained may, for example, be a sludge or slurry. The treatment can reduce the level of impurities in the calcium sulfate that adversely affect the downstream cement clinker process and cement quality to the content required by the downstream cement clinker process.

An acid is added for treatment of the calcium sulfate in step a). The acid is preferably a dilute acid. Dilute acids are acids that have been diluted with water (aqueous acids). The acid, preferably the dilute acid, is preferably an inorganic acid, e.g. hydrochloric acid, nitric acid, sulfurous acid and/or sulfuric acid, particular preference being given to sulfurous acid and/or sulfuric acid.

In step a), the acid is preferably added in such an amount that the ratio of solids to liquid (S/L ratio) in the suspension is in the range from 1/10 to 1/1, more preferably 1/5 to 1/1, more preferably 1/5 to 1/1.3, even more preferably 1/4 to 1/2. The ratio of solids to liquid (S/L ratio) is based on the mass of solids in kilograms and the volume of the liquid in liters at a reference temperature of 20° C.

The concentration of the acid used is chosen here such that the acid resulting from the treatment in step a) is, for example, in the range from 1 to 12 molar, preferably in the range from 3 to 10 molar, more preferably in the range from 5 to 8 molar, the acid being an aqueous acid. What is meant by 1 molar here is 1 mol of acid per 1 liter of solution at 20° C. Since the calcium sulfate to be treated may contain water, the concentration of the acid added may be higher than the concentration of the acid resulting after the addition. In general, the molarity of the acid added is preferably within the ranges specified above and hereinafter for the resulting acid.

It has been found that the yield of rare earths at these concentrations of acid, especially of sulfurous acid and/or sulfuric acid, is particularly advantageous since the rare earths in step a) form sparingly soluble salts and can be separated off in solid form. This increases the possible yield in the leaching of the rare earths in step b2).

The acid resulting from the treatment after step a) is preferably a 1 to 12 molar, preferably 5 to 8 molar, sulfurous acid or a 1 to 12 molar, preferably 5 to 8 molar, sulfuric acid. The acid added is therefore preferably a sulfurous acid or a sulfuric acid.

The treatment in step a) is conducted, for example, at a reaction temperature in the range between ambient temperature and boiling point of the reaction mixture, for example at a temperature in the range from 15° C. to 100° C., preferably 30° C. to 80° C., more preferably 45 to 75° C.

The duration of treatment in step a) or the reaction dwell time for the establishment of the contents of impurities in the acid is, for example, in the range from 5 minutes to 120 minutes, preferably from 15 to 100 minutes, in particular 15 to 90 minutes, especially preferably 20 to 60 minutes.

During the treatment of step a), the suspension or reaction mixture for adjustment of the contents of impurities is preferably kept in motion, for example by circulation, stirring or blowing in gas.

For step a), the calcium sulfate generated in phosphoric acid production is fed from the separation unit, preferably filtration unit, of the phosphoric acid production to a calcium sulfate reaction unit, or the calcium sulfate from a stockpile from phosphoric acid production. The calcium sulfate is treated with the acid added therein. The calcium sulfate reaction unit may be a simple stirrer device, for example stirred vessel.

In step b) of the process of the invention, the purified calcium sulfate, after treatment in solid form, is separated from the liquid phase of the suspension obtained. The suspension obtained may be a slurry. The separation of solids or purified calcium sulfate and liquid phase from the suspension is especially a mechanical separation and can be effected, for example, by centrifugation or filtration, preference being given to filtration.

The purified calcium sulfate obtained in step b) as obtained after the separation may be present dihydrate, hemihydrate, anhydrite or in the form of a mixture of at least two of said components, preference being given to calcium sulfate in the form of anhydrite. The desired composition of the calcium sulfate is dependent on the required (cement/clinker producer) and/or desired (phosphoric acid producer) degree of $P_2O_5$ reduction. The desired composition of the calcium sulfate is dependent on the required and/or desired degree of $P_2O_5$ reduction; a cement/clinker producer will determine the required degree of $P_2O_5$ reduction, whereas a phosphoric acid producer will define the desired degree of reduction. The treatment with acid and subsequent separation from the liquid phase can especially reduce the content of fluorine and phosphorus in the calcium sulfate that are present as impurities. The liquid phase removed is generally an acid-containing aqueous solution comprising water and $P_2O_5$ inter alia.

According to the present disclosure, the purified calcium sulfate separated off which is obtained in step b) contains at least 5% by weight of anhydrite, preferably at least 30% by weight, and in some cases at least 50% by weight, of anhydrite, based on dry calcium sulfate.

The $D_v(50)$ of the grain size distribution of the calcium sulfate produced in step b), especially calcium sulfate anhydrite, after the purification is, for example, 0.5-100 μm, especially preferably 1-50 μm, in particular 2-30 μm. The $D_v(50)$ is defined as the value at which 50% by volume of the particles have a greater diameter than the value specified is.

In a preferred embodiment, in step b), the liquid phase which is obtained after the solids have been separated off is used as feedstock in phosphoric acid production. The liquid phase or filtrate may be used in existing phosphoric acid production, especially in the existing phosphoric acid-sulfuric acid complex, as "recycle acid", which can be fed to the reaction unit for phosphoric acid production for reaction with the raw phosphate.

For step b), the suspension/slurry present in the calcium sulfate reaction unit is transferred to a calcium sulfate separation unit in which the liquid and the resulting solids (purified calcium sulfate) can be separated from one another. The separation unit may, for example, be a filtration unit or a centrifuge unit, preference being given to a filtration unit.

The process of the invention is preferably characterized in that the aqueous solution used for the leaching of the rare earths from the calcium sulfate in step b1) comprises a salt and/or chelate ligand in a concentration of 1% to 50% by weight, preferably of 1% to 20% by weight, especially preferably of 5% to 10% by weight.

It is also possible that the rare earths in step b1) are leached out of the calcium sulfate by addition of water.

The process of the invention is preferably characterized in that the salt used for the leaching of the rare earths from the phosphogypsum in step b1) comprises a chloride and/or a nitrate and/or that a chelate ligand is used in step b1).

The chelate ligand here is not limited in principle, but includes all chelate ligands that form a soluble complex with at least one of the rare earths.

Preferred chelate ligands include ethylenediaminetetraacetic acid (EDTA), diethylenetriaminepentaacetic acid (DTPA) and/or citric acid and/or the corresponding salts thereof.

Useful salts here are especially the sodium, ammonium, calcium, magnesium and potassium salts with the anions chloride, nitrate, acetate, bromide, bromate, perchlorate and iodide. It has also been found that the use of ammonium sulfate can be productive in particular cases.

The nitrate here may also be introduced into step b1) in the form of preferably dilute nitric acid.

One example process is characterized in That the dwell time for the leaching of the rare earths from the phosphogypsum in step b1) is 20 min to 80 h, preferably 1 h to 76 h or 2 h to 72 h, especially preferably 3 h to 70 h and very especially preferably 4 h to 68 h, in particular according to the present disclosure 5 h to 68 h or preferably 5 h to 64 h.

The reaction mixture is preferably kept in motion in step b1) during the reaction time.

The reaction mixture is preferably kept in motion in step b1) during the reaction time by circulation, stirring or blowing in gas.

The reaction is preferably conducted in step b1) at a temperature of 10 to 100° C., preferably of 15 to 80° C., very especially preferably of 20 to 75° C. and in particular at a temperature of 20 to 60° C.

The reaction in step b1) may preferably be conducted even at room temperature without additional heating or cooling.

The process of the invention is preferably characterized in that the weight ratio of solids to liquid (S/L ratio) for the leaching of the rare earths from the phosphogypsum in step b1) is 1:1 to 1:10 and preferably in the range from 1:2 to 1:5.

The process of the invention is preferably characterized in that the separation of the further-purified phosphogypsum in solid form from the liquid phase comprising one or more rare earths in step b2) comprises a centrifugation, filtration, sedimentation and/or evaporation of the liquid phase.

The process of the invention is preferably characterized in that rare earths are recovered by means of solvent-solvent extraction, ion exchange methods, precipitation as hydroxides, oxalates, carbonates and/or phosphates, from the solution, containing one or more rare earths, obtained in step b2).

Suitable ion exchange methods here especially include cation exchange methods or a combination of cation exchanger and ion exchanger.

The process of the invention is preferably characterized in that phosphogypsum separated off in step b2) has a moisture content of 0% to 60% by weight, preferably of 5% to 50% and especially preferably of 10% to 40% by weight, and is sent to the raw meal processing of a clinker process unit.

However, there are also conceivable process regimes wherein a slurry or suspension of calcium sulfate is obtained in step b2) and processed further.

It is possible to directly use the purified calcium sulfate separated off that has been obtained in step b) as purified and processed calcium sulfate separated off. It is alternatively possible that the purified calcium sulfate obtained in step b) is subjected to one or more further purification steps, especially for removal of rare earths and optionally for removal of radioactive elements and/or heavy metals, for example Cd, Pb, Hg, before the purified calcium sulfate is sent to step c). The optional additional purification steps are elucidated hereinafter.

The purified calcium sulfate used in step c) preferably has a $P_2O_5$ content of less than 0.5% by weight, preferably less than 0.25% by weight, more preferably less than 0.05% by weight, and a fluoride content of less than 0.5% by weight, preferably less than 0.25% by weight, more preferably less than 0.15% by weight, and even more preferably less than 0.05% by weight. A purified calcium sulfate having the level of purity mentioned with regard to $P_2O_5$ and fluorine is preferably obtained directly after step b). The purification step of steps a) and b) and any purification step for removal of rare earths may possibly also fully or partly remove unwanted heavy metals and/or radioactive elements, especially radioactive elements, that are present in the calcium sulfate.

In step c) of the process of the invention, the purified and processed calcium sulfate separated off is mixed with admixtures and reducing agents in order to obtain a raw meal mixture for cement clinker production. The calcium sulfate is mixed here in the correct ratio with the necessary admixtures for the required cement clinker quality. As already stated, the Müller-Kühne process and the OSW-Krupp process for the reaction of calcium sulfate with admixtures and reducing agents to give cement clinker and $SO_2$ or sulfuric acid have long been known. Further details in this regard can be found in the specialist literature, for example Ullmann's Encyclopedia of industrial chemistry, 5th edition, 1986, vol. A5, "Cement and Concrete", p. 489-537, or patent specification AT 292539 B. In general, cement clinker is produced from a raw material mixture referred to as raw meal, comprising calcium oxide, silicon dioxide and oxides of aluminum and iron.

Components for production of the raw meal in step c) may, as well as purified phosphogypsum/calcium sulfate, be the admixtures known to the person skilled in the art for the clinker composition which are mixed into the calcium sulfate, with formation of the calcium component entirely from the purified calcium sulfate removed in the raw meal mixture. "Entirely" here does not rule out the possibility that calcium may be present in small amounts or as impurities in the admixtures. "Entirely" here means that at least 95%, more preferably at least 99%, even more preferably at least 99.9%, of the calcium present in the cement clinker comes from the purified calcium sulfate separated off. As a result, the admixtures used are free or largely free of calcium.

Additives are especially Al carriers, for example bauxites, clays and tonsteins, shales, etc., Fe carriers, for example iron ores, laterites, etc. and Si carriers, for example sands, sandstones, quartzites, clays and tonsteins, shales, etc. and one or more reducing agents, for example a carbon and/or hydrocarbon carrier, e.g. charcoal, coke, pet coke or charcoal/coke produced from renewable raw materials (biocharcoal/coke), and/or elemental sulfur.

It will be apparent that the type and amount of the admixtures are chosen such that, together with the calcium sulfate, they result in a raw meal having suitable chemical composition for a cement clinker.

Suitable fuels are solid fuels, for example charcoal, coke, pet coke, solid secondary fuels, etc. and liquid fuels, for example oil, heavy oil, liquid secondary fuels, etc. or gaseous fuels, for example natural gas, biogas, hydrogen, or else a combination of aforementioned fuels.

Additives and/or mineralizers for accelerated breakdown of the purified calcium sulfate and/or for improved formation of clinker minerals may likewise be added.

Raw meal for the production of cement clinker refers to the mixture of substances comprising calcium sulfate, all admixtures that are customary for cement, and additives/mineralizers including reducing agents.

For the raw meal preparation in step c), the purified calcium sulfate is preferably dried to a desired residual moisture content, for example in a drum dryer and/or entrained flow dryer and/or fluidized bed; the water content of the dried calcium sulfate is, for example, below 22% by weight, preferably 12-14% by weight, more preferably below 5% by weight, even more preferably below 1% by weight. The water content here is based solely on free water; any water of hydration present is not taken into account.

The dried calcium sulfate and all the customary admixtures are sent to a conventional tank and/or mixing device. Useful examples that are employed for this purpose include an elongated mixing bed and/or round mixing bed and/or trough tank and/or open-air tank and/or conventional silos, such as a tangentially mixed silo, multi-cell silo, conical silo or multichamber silo. For example, such a mixing bed is described in detail in DE 10252585, or such silo types in DE10118142 or DE 10344040.

The raw materials (calcium sulfate and admixtures) are ground separately or collectively to the fineness needed for the clinker process. This comminution may be executed as a mill-drying operation, in which the waste heat from the process (e.g. preheated gases) and/or specially supplied heat (e.g. offgases from a hot gas generator) are utilized.

Comminution equipment used for the comminution is equipment such as at least one vertical roll mill and/or a roll press and/or a stirred ball mill and/or ball mill and/or vertical roller mill and/or rod mill and/or magnetic mill. Corresponding equipment is known, for example, from property rights DE 102012111217, DE 102014108334 or DE 102017114831.

The ground raw materials are fed collectively or separately to one or more silos for intermediate storage and/or homogenization.

The chemical composition of the raw meal mixture, before being introduced into the clinker process, is checked continuously and, in the case of variances from defined target values, corrected by changes in the dosages.

The raw meal thus pretreated is introduced into the clinker plant in a dosed manner, optionally together with reducing agent.

The reducing agent serves to assist the elimination of SO2 in the thermal breakdown of the purified calcium sulfate.

The reducing agent is crushed and or ground separately to the necessary fineness. This comminution can be executed as combined drying and grinding. The reducing agent thus prepared is fed together with the pretreated raw meal to the clinker plant and/or separately at one or more points to the clinker plant.

Alternatively, the raw meal may be supplied with a liquid content of the mixture of 9% by weight—22% by weight, preferably between 12% by weight—14% by weight, to a shaping device for production of agglomerates. These agglomerates may be dried and stored intermediately in a separate device. The raw meal thus agglomerated is then fed to the preheating device and the burning process. The agglomerates have a size of more than 250 µm, preferably more than 500 µm, down to the low mm range. Shaping equipment employed may, for example, be a press and/or a pan and/or a drum and/or a mechanical fluidized bed reactor and/or a shaping stirred mixer.

In step d) of the process of the invention, the raw meal which is produced in step c) is converted to cement clinker by a thermal process, especially in a cement clinker process unit, with formation of sulfur dioxide as offgas. The cement clinker produced in step d) can be used for cement production.

In step d), the raw meal is preferably preheated to a temperature of up to 800° C. with process gases from the burning or cooling process for reduction of energy consumption, which drives out adhering surface moisture and at least partly calcines the admixtures.

On further preheating above 800° C., the majority of the calcium sulfate is broken down under the action of the reducing agent to form $SO_2$.

The preheating and breakdown of the raw meal can be conducted, for example, in a heat exchanger, preferably an entrained flow heat exchanger.

The $SO_2$-containing process gas is preferably separated out here by a separation system downstream of the preheating device and sent to a utilization process, for example a sulfuric acid plant.

In a subsequent step, the final breakdown of the raw meal and subsequent formation of the cement clinker (clinker burning) is effected; the process gases from this step are sent to the heat exchanger. This burning of the raw meal is effected in a furnace, preferably a rotary furnace. The burning temperature for cement clinker production may, for example, be in the range from 1200° C. to 1600° C., preferably at a temperature of 1200° C. up to 1500° C. The combustion time may, for example, be 5 minutes to 60 minutes.

In a preferred embodiment, the raw meal is burnt with oxygen-enriched process air containing more than 21% by volume, preferably more than 45% by volume, more preferably more than 60% by volume, and up to 100% by volume, of oxygen. Corresponding process air can readily be produced by mixing in oxygen. This is a particularly preferred embodiment of the oxyfuel process. Details of the oxyfuel process are described, for example, in EP 2449328 A1, EP 1037005 B1, WO 2019-211196 A1, WO 2019-211202 A1 or JP 2007-126328 A, and reference is made thereto.

The use of oxygen-enriched process air can increase the concentration of $SO_2$ in the process gas; this facilitates the recovery of sulfuric acid from SO2-containing gases.

The abovementioned process air may have been utilized beforehand for cooling of the burnt material. It is likewise conceivable that this process air is fed directly to the furnace. It would likewise be conceivable that the process gas is at least partly drawn off in a bypass system and/or from the entrained flow reactor, then enriched with oxygen and fed back to the burning process.

The clinker coming from the furnace is preferably cooled down by a suitable cooling system to a temperature below 120° C., preferably below 100° C. The cooler output air may be supplied at least partly to the burning process and/or the preheating process and/or the raw meal production and/or the calcium sulfate drying. The process air fed to the cooling system may at least partly be enriched with oxygen. It would likewise be conceivable for at least a portion of the cooler output air to be utilized for power generation. The material cooled down by the cooling process, after possible further process steps, is sent to a tank facility and/or packing facility.

The cement clinker thus produced can be processed further to cement. The cement clinker or cement produced by this method has a smaller $CO_2$ footprint than customary clinker or cement produced on the basis of carbonate rocks.

The abovementioned processes, for example use of phosphogypsum as $CO_2$-neutral raw material and the use of the oxyfuel process lower the CO2 footprint of the cement plant. In addition, the use of at least partly renewable power for operation of the plant components can further reduce the CO2 footprint.

In step e) of the process of the invention, the sulfur dioxide formed in step d) is fed as raw material to sulfuric acid production in order to produce sulfuric acid, for example by the single-contact or double-contact method. Sulfuric acid production based on $SO_2$ is very familiar to the person skilled in the art. Details thereof can be found in the technical literature, for example Ullmann's Encyclopedia of industrial chemistry, 5th edition, 1994, vol. A25, "Sulfuric Acid and Sulfur Trioxide", p. 635-705 or Handbook of Sulphuric Acid Manufacturing, by Douglas K. Louie, 2nd edition 2008, published by DKL Engineering The sulfuric acid produced in step e) may be used, for example, in phosphoric acid production as starting material for the reaction with the raw phosphate. Alternatively, the sulfuric acid produced, as required, can be sent to a further or another utilization. The treated sulfur dioxide gas can optionally be fed to the sulfuric acid production plant existing in the phosphoric acid production or to a new sulfuric acid production plant.

In a preferred embodiment, the sulfur dioxide which is drawn off in step d) as offgas from the cement clinker process unit is sent to a sulfur dioxide offgas treatment before being supplied to sulfuric acid production in step e). The offgas treatment is preferably an offgas purifying operation in order to remove solid particles and residual moisture from the $SO_2$ gas.

In an optional variant of the process of the invention, the process comprises an additional purification step for the calcium sulfate obtained after step b), which is performed before the calcium sulfate is mixed with the admixtures and reducing agents in step c). In this additional purification step, it is possible to wash any rare earth metals present as an impurity out of the calcium sulfate.

In the optional additional purification step for removal of rare earths from the calcium sulfate before supply to step c), the purified calcium sulfate obtained in step b) is preferably treated with a liquid, preferably water or an aqueous solution containing salt and/or chelate ligand. After the treatment, the calcium sulfate is separated in solid form from the liquid phase in the suspension thus obtained. The calcium sulfate purified further and separated off in this way is then supplied to step c). The liquid phase contains one or more rare earths as dissolved ions and can be sent to further processing to recover the rare earths. For example, this processing operation comprises the conversion of sparingly soluble rare earth sulfates to soluble forms.

The process of the invention can also serve to remove radioactive elements and/or heavy metals. The resultant purified calcium sulfate after step b), given suitable adjustment of the reaction conditions (S/L ratio, dwell time, concentration of acid and temperature), shows distinct depletion of radioactive elements, for example thorium and uranium. In the further optional purification step for recovery of rare earths, it is additionally possible to remove heavy metals (and further radioactive constituents), for example cadmium and lead, through suitable choice of the workup step. The purified calcium sulfate, before being supplied to step c), may therefore have a reduced content of phosphorus and fluorine and possibly of rare earths, radioactive elements and/or heavy metals. It will be apparent that the reduced content of the respective element relates to the comparison with the content of the respective element in the calcium sulfate which is supplied to step a).

The integrative approach or integrative process of the invention is especially characterized by the following features or advantages:

The process for production of cement clinker or cement, with regard to the starting quality of the phosphogypsum, can be run flexibly and in combination with the phosphoric acid process, The sulfuric acid produced from the $SO_2$ offgas can be introduced into the overall complex and consumed, and also generated and, for example, circulated, The following processing operations may be combined, for example, in their entirety or optionally for the production of cement clinker/cement and sulfuric acid from calcium sulfate:

Chemical and thermal modification of the phosphoric acid process for specific production of a phosphogypsum quality suitable for the cement clinker process Mechanical removal of the phosphogypsum from the running phosphoric acid process, for example by centrifugation, filtration, evaporation or settling/sedimentation of the calcium sulfate/phosphogypsum sludge Chemical-thermal and mechanical separation of phosphorus from the phosphogypsum, for example by chemical conversion, recrystallization, precipitation, flocculation Chemical-thermal and mechanical separation of fluorine from the phosphogypsum, for example by chemical conversion, recrystallization, precipitation, flocculation Chemical-thermal and mechanical separation of radioactive components from the phosphogypsum, for example by chemical conversion with heating/cooling, recrystallization, precipitation, flocculation Chemical-thermal and mechanical separation of heavy metals from the phosphogypsum, for example by chemical conversion with heating/cooling, recrystallization, precipitation, flocculation Chemical-thermal and mechanical separation of rare earths from the phosphogypsum, for example by chemical conversion with heating/cooling, recrystallization, precipitation, flocculation Chemical and/or thermal and/or mechanical dewatering of the phosphogypsum, for example by heating/cooling, flocculation and precipitation, filtration Mechanical treatment of the dry phosphogypsum, for example by comminuting, sifting Mixing of the phosphogypsum with additives to give a raw meal mixture for achievement of specific and commercial cement clinker/cement qualities Thermal and mechanical separation of the sulfur dioxide from the raw meal mixture in the course of the burning process in cement clinker production Thermal and chemical conversion of the raw meal mixture to cement clinker Chemical and mechanical conversion of the cement clinker to commercial cement quality Dry- and wet-chemical purification of the sulfur dioxide-containing offgas separated off, for example by electrofiltration, absorption Chemical and thermal modification of the sulfuric acid process for incorporation and use of the sulfur dioxide generated into plants for production of sulfuric acid Chemical conversion of the purified sulfur dioxide-containing offgas to sulfuric acid of commercial quality which is reusable in the phosphoric acid process, for example by the single-contact or double-contact process.

According to the available quality of the calcium sulfate used, the production processes have to be chosen flexibly and matched to one another in terms of the choice of process procedures and parameters. The quality of the calcium sulfate achievable from the phosphoric acid process is dependent on factors such as raw phosphate used and process conditions in the digestion of the raw phosphate with sulfuric acid.

The extent of the purification, especially with regard to the reduction in the phosphorus and/or fluorine content, of the calcium sulfate in step a) may be adjusted with reference to the impurities present in the admixtures used, and the guide values for fluorine and phosphorus to be observed for the cement clinker. The guide values for phosphorus are preferably not more than 1.0% by weight, more preferably not more than 0.5% by weight and even more preferably not more than 0.1% by weight of $P_2O_5$ and/or the guide values for fluorine are preferably not more than 0.5% by weight, more preferably not more than 0.25% by weight and even more preferably not more than 0.1% by weight of F. This is possible on account of the integrative approach, since all process steps are considered collectively with reference to their respective demands. The extent of purification can be established via the adjustment of the parameters in step a), for example S/L ratio, concentration of the acid, and treatment temperature and time.

The liquid budget, especially the water budget, of phosphoric acid production is changed only insignificantly, if at all, by the integrated process, especially since the liquid input, especially water input, for purification of the calcium sulfate in the process in step a) can be coupled to the liquid budget, especially water budget, of phosphoric acid production. The liquid budget or water budget of phosphoric acid production comprises the liquid or water which is supplied to the production, and the liquid or water which is discharged from the production. Changes in the liquid budget, especially water budget, have a significant influence on the efficiency of the process steps in phosphoric acid production.

The invention also relates to a plant for production of sulfuric acid and cement clinker using calcium sulfate which is formed and separated off as a solid by-product in phosphoric acid production in the reaction of raw phosphate with sulfuric acid to form phosphoric acid, wherein the plant comprises the following devices:

a) a calcium sulfate reaction unit suitable for treating the calcium sulfate separated from the phosphoric acid therein with an acid in order to obtain a suspension comprising purified calcium sulfate, b) a 1st calcium sulfate separation unit suitable for separating the purified calcium sulfate in solid form from the liquid phase of the suspension obtained, b1) a rare earth recovery unit suitable for converting the rare earths present in the calcium sulfate to solution, b2) a 2nd calcium sulfate separation unit suitable for separating the purified calcium sulfate in solid form from the liquid phase comprising the rare earths, c) a raw meal mixing unit suitable for mixing the purified calcium sulfate separated off with admixtures and reducing agents therein in order to obtain a raw meal mixture for cement clinker production, d) a cement clinker production unit, for example a combination of preheating unit, a burner unit and at least one cooling unit that are suitable for preheating, burning and cooling the raw meal mixture in order to obtain the cement clinker, with formation of sulfur dioxide as offgas, and e) a sulfuric acid production plant which is supplied with the sulfur dioxide offgas that has been formed in the cement clinker production unit and optionally purified as raw material, in order to produce sulfuric acid, wherein the sulfuric acid production plant may be part of the phosphoric acid production plant or an external sulfuric acid production plant and/or another utilization.

The plant may be used for the above-described process of the invention. For details relating to the individual devices or units, reference is made to the above details thereof. The above details for the process correspondingly applicable to the plant.

It is preferable that, in the plant of the invention, the calcium sulfate separation unit is connected fluidically, for example via a pipeline, to the phosphoric acid production plant, in order that the liquid phase obtained in the calcium sulfate separation unit can be introduced as feedstock into the phosphoric acid production.

It is preferable that, in the plant of the invention, the calcium sulfate separated off for step a) can be supplied by a separation unit in phosphoric acid production that separates the phosphoric acid from the calcium sulfate, or from a stockpile of calcium sulfate from phosphoric acid production.

The invention is described hereinafter by working examples, which are elucidated in detail by the figures. The working examples are not intended to restrict the scope of the invention claimed in any way.

FIG. 1 shows a flow diagram of phosphoric acid production (existing complex) and an integrated process for production of cement clinker and sulfuric acid from calcium sulfate that originates from phosphoric acid production (integrated complex). The phosphate rock is processed in a processing unit 1 in order to obtain the raw phosphate. The raw phosphate is reacted in the reaction unit of the phosphoric acid plant 2 with sulfuric acid coming from the sulfuric acid production plant, in order to form phosphoric acid and solid calcium sulfate as by-product. The calcium sulfate generated in phosphoric acid production is separated from the phosphoric acid in filtration unit 3 of the phosphoric acid plant and sent to the calcium sulfate reaction unit 5. The calcium sulfate is treated there with acid, such that, after the treatment, for example, a 1-12 molar acid, especially a 1-12 molar sulfuric acid, is obtained. For example, it is possible to add a 1-12 molar sulfuric acid for treatment. The treatment can be conducted after addition of the acid, for example, at a temperature of 15-100° C. for 5 to 120 min, preferably with movement of the suspension obtained, for example by stirring. This reduces the level of impurities in the calcium sulfate that adversely affect the downstream cement clinker process and cement quality to the content required by the cement clinker process. In a calcium sulfate separation unit 6, which is preferably a filtration unit, the liquid and the resulting solids are separated from one another. The liquid, especially the filtrate, can be used in the existing phosphoric acid-sulfuric acid complex. The treated calcium sulfate is sent to the raw meal preparation unit 7 upstream of the cement clinker process. The calcium sulfate is mixed therein with the necessary admixtures for the required cement clinker quality in the correct ratio. The cement clinker raw meal prepared is used to charge the cement clinker process unit 8, preferably with preheating of the raw meal in a heat exchanger prior to supply to the process unit 8 (not shown). In the cement clinker process unit 8, sulfur dioxide is separated from the calcium sulfate and fed as offgas from the cement clinker process unit to the sulfur dioxide offgas treatment 9. The treated sulfur dioxide gas may optionally be supplied to the existing sulfuric acid production plant 4. Alternatively, the treated sulfur dioxide gas may optionally be supplied to a new sulfuric acid production plant (cf. 13 in FIG. 2). The calcium remaining in the cement clinker process unit is reacted with the admixtures to give cement clinker, for example. The combustion temperature for cement clinker production may, for example, be at a temperature in the range from 1200° C. to 1600° C. and a combustion time of 5 minutes to 60 minutes. The cement clinker thus produced is cooled and can be processed further to cement.

Figure 2:
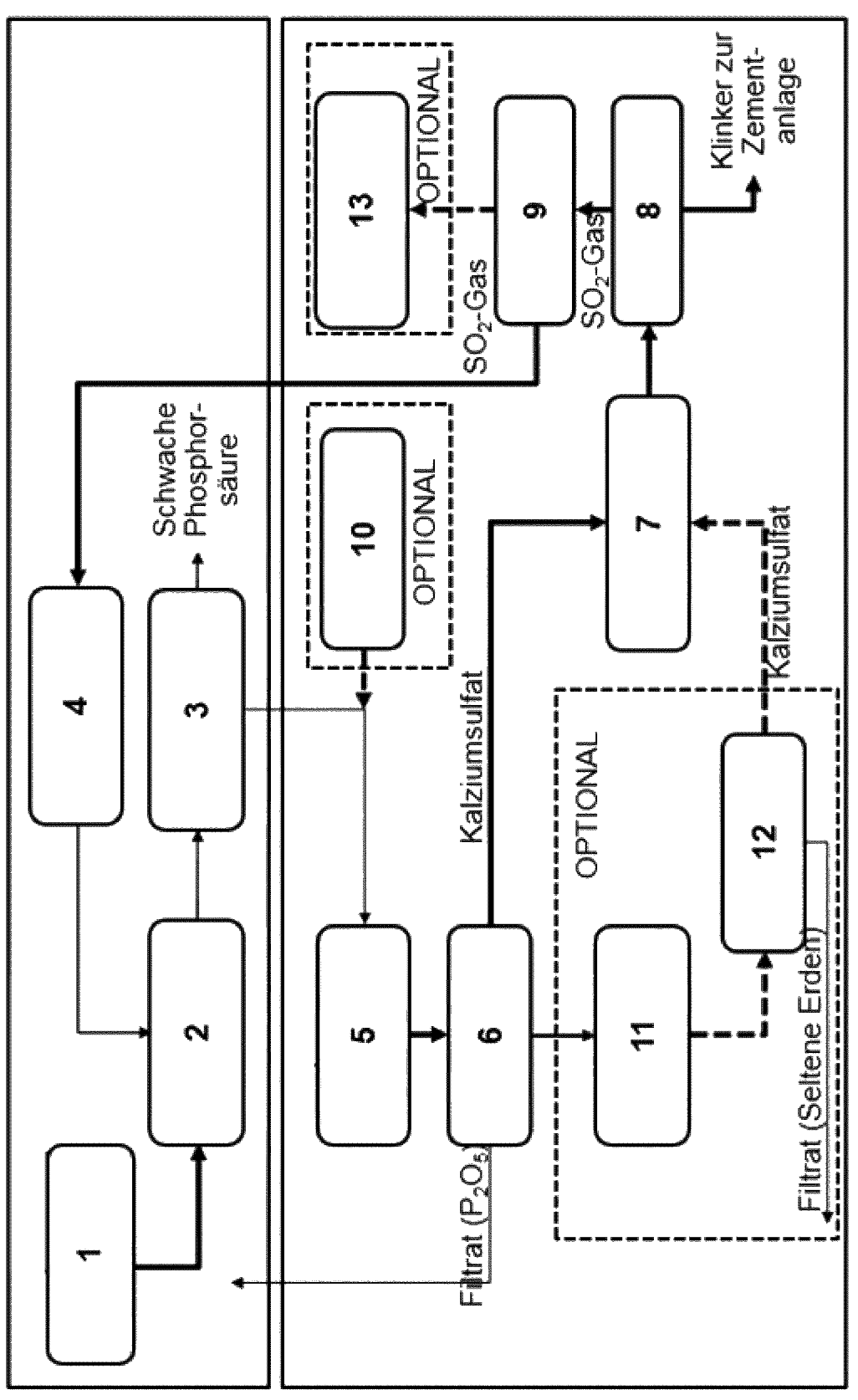
FIG. 2 is a schematic flow diagram for utilization of calcium sulfate from phosphoric acid production by means of an integrated complex for production of cement clinker and sulfuric acid as in FIG. 1, additionally showing alternative or additional process steps.

FIG. 2 shows a schematic flow diagram for utilization of calcium sulfate from phosphoric acid production by means of an integrated complex for production of cement clinker and sulfuric acid according to FIG. 1, additionally showing alternative or additional process steps. There follows a discussion of the alternative or additional process steps; otherwise, reference is made to the elucidations relating to FIG. 1. FIG. 2 shows an alternative source for the calcium sulfate used in step a). Rather than the calcium sulfate from the filtration unit of the phosphoric acid plant 3, it is possible to use a calcium sulfate from a stockpile 10 of the calcium sulfate used in step a), this being deposited calcium sulfate from phosphoric acid production. In addition, FIG. 2 shows the optional processing step for removal of rare earths, which comprises a reaction unit for recovering rare earth metals from the calcium sulfate 11 and the calcium sulfate separation unit 12 for separation of the liquid phase from the purified calcium sulfate. FIG. 2 also shows that the sulfur dioxide obtained from the SO₂ treatment 9 can be used for the recovery of sulfuric acid in the existing sulfuric acid production plant 4 and/or a new sulfuric acid production plant 13.

Figure 3:
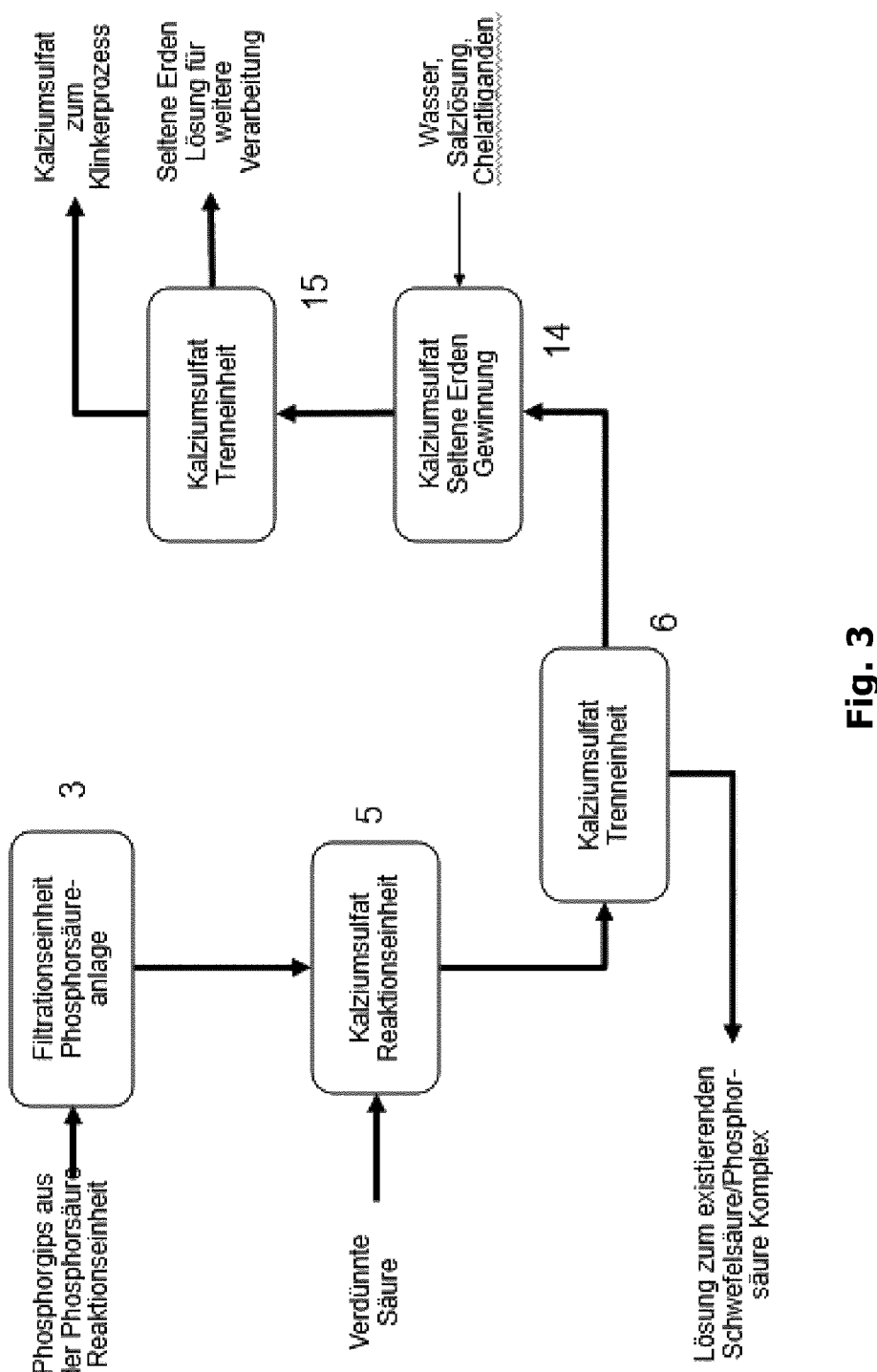
FIG. 3 is a schematic flow diagram for recovery of rare earths from the calcium sulfate obtained in phosphoric acid production.

FIG. 3 shows a schematic flow diagram for recovery of rare earths from the calcium sulfate obtained in phosphoric acid production. The calcium sulfate generated in phosphoric acid production is fed from the filtration unit 3 to the phosphoric acid plant of the calcium sulfate reaction unit 5. The calcium sulfate is treated with acid therein. This reduces the level of impurities in the calcium sulfate that adversely affect the recovery of rare earths, and the optional downstream clinker process and cement quality. In a 1st calcium sulfate separation unit 6, which is preferably a filtration unit, the liquid and the resulting solids are separated from one another. The liquid, especially as filtrate, can be used in the existing calcium sulfate-sulfuric acid complex. In a calcium sulfate-rare earth recovery unit 14, the purified calcium sulfate is treated with water or with a salt- and/or chelate ligand-containing aqueous solution bring the rare earths into solution. In a 2nd calcium sulfate separation unit 15, solution containing rare earths is separated from the remaining calcium sulfate. The calcium sulfate is preferably sent to a clinker process.

EXAMPLES

Some examples are described hereinafter for recovery of rare earths and removal of radioactive elements and heavy metals. The contents of rare earths, radioactive elements and heavy metals of the gypsum samples were determined by means of ICP-OES on a SPECTRO ARCOS with radial viewing of the plasma from SPECTRO Analytical Instruments. For this purpose, in each case, about 0.4 g of the appropriate gypsum sample was digested by microwave digestion at 190° C. (heating time of 8 minutes and hold time of 6 minutes) in a mixture of 10 ml of nitric acid and 3 ml of hydrochloric acid and then diluted with water—in accordance with the expected contents—and analyzed. The analysis results are compared with a standard calibration with a very substantially identical matrix. Filtrates—in accordance with the expected contents—were diluted with water and likewise evaluated with a standard calibration. The rare earth contents of the gypsum and filtrate samples are reported hereinafter as cumulative parameters.

Example 1

In a first step, 75 g of a PG A gypsum was stirred by means of a precision glass stirrer with 150 ml (S/L=0.5) of 8 molar sulfuric acid at 60° C. for 20 minutes. After the time had elapsed, the suspension was filtered rapidly and washed twice with 86.3 ml of water at room temperature. The filtrate together with the wash water (320.9 g in total) was collected and retained for further analyses. 1 g of the treated gypsum that had been dried at 50° C. for at least 24 h, in a 2nd step, was admixed with 10 ml (S/L=0.1) of a 10% $NaNO_3$ solution and stirred at room temperature for 18 h. On completion, the filtrate from step 2 was separated off. By means of ICP-OES, the gypsum samples and the filtrates were analyzed for the content of rare earths. The rare earth concentration (as cumulative parameter) of the original PG A gypsum was RE=430 mg/kg; corresponding to 0.430 mg of rare earths in 1 g of the original gypsum. After the 1st step, for the treated gypsum, an RE concentration of RE=548 mg/kg was ascertained, corresponding to 0.548 mg of rare earths in 1 g of treated gypsum. The increasing concentration in the treated gypsum is attributable to the virtually complete conversion of dihydrate to anhydrite and associated losses of water of crystallization in the treated gypsum. In the filtrate (total amount 320.9 g), after the 1st step, a concentration of 0.9 mg/kg was determined, which corresponds to 0.004 mg per g of gypsum. Thus, in the first step, only 0.9% of the rare earths goes into solution. In the 2nd step, a total amount of 0.194 mg of rare earths was found in the filtrate. This corresponds to a yield of 35.5%.

Example 2

The same gypsum from example 1 pretreated according to step 1 was treated by a 2nd step in a further experiment. 1 g of the pretreated gypsum, in a 2nd step, was admixed with 10 ml (S/L=0.1) of a 10% $NH_4NO_3$ solution and stirred at room temperature for 64 h. On completion, the filtrate from step 2 was separated off. In the 2nd step, a total amount of 0.373 mg of rare earths was found in the filtrate. This corresponds to a yield of 68.1%.

Example 3

The same gypsum from example 1 pretreated according to step 1 was treated by a 2nd step in a further experiment. 1 g of the pretreated gypsum, in a 2nd step, was admixed with 10 ml (S/L=0.1) of a 10% $NH_4NO_3$ solution and 0.1 M nitric acid solution and stirred at room temperature for 64 h. On completion, the filtrate from step 2 was separated off. In the 2nd step, a total amount of 0.414 mg of rare earths was found in the filtrate. This corresponds to a yield of 81.3%.

Example 4

The same gypsum from example 1 pretreated according to step 1 was treated by a 2nd step in a further experiment. 1 g of the pretreated gypsum, in a 2nd step, was admixed with 10 ml (S/L=0.1) of a 10% $Na_2EDTA$ solution and stirred at room temperature for 3 h. On completion, the filtrate from step 2 was separated off. In the 2nd step, a total amount of 0.135 mg of rare earths was found in the filtrate. This corresponds to a yield of 24.7%.

Example 5

In order to check whether recovery of the rare earths is possible directly by the 2nd step even without pretreatment (step 1), 1 g of the PG A gypsum was admixed directly with 10 ml (S/L=0.1) of a 10% $NH_4NO_3$ solution and stirred at room temperature for 18 h. On completion, the filtrate was separated off. A total amount of 0.001 mg of rare earths was found in the filtrate. This corresponds—based on the PG A gypsum—to a yield of just 0.1% and shows that a pretreatment according to step 1 is absolutely necessary.

Example 6

In a first step, 75 g of a PG B gypsum was stirred by means of a precision glass stirrer with 150 ml (S/L=0.5) of 8 molar sulfuric acid at 60° C. for 20 minutes. After the time had elapsed, the suspension was filtered rapidly and washed twice with 86.3 ml of water at room temperature. The filtrate together with the wash water (346.7 g in total) was collected and retained for further analyses. 4 g of the treated gypsum that had been dried at 50° C. for at least 24 h, in a 2nd step, was admixed with 40 ml (S/L=0.1) of water and stirred at room temperature for 5 h. On completion, the filtrate from step 2 was separated off. By means of ICP-OES, the gypsum samples and the filtrates were analyzed with regard to the yield of rare earths. The rare earth concentration (as cumulative parameter) of the original PG B gypsum was RE=5.82 g/kg; corresponding to 5.82 mg of rare earths in 1 g of the original gypsum. After the 1st step, for the treated gypsum, an RE concentration of RE=6.26 g/kg, corresponding to 6.26 mg of rare earths in 1 g of treated gypsum, was ascertained. The increasing concentration in the treated gypsum is attributable to the virtually complete conversion of dihydrate to anhydrite and associated loss of water of crystallization in the treated gypsum. In the filtrate (total amount of 346.7 g), after the 1st step, a concentration of 69.9 mg/kg was determined, which corresponds to 0.323 mg per g of gypsum. Thus, in the first step, only 5.5% of the rare earths goes into solution. In the 2nd step, a total amount of 2.24 mg of rare earths was found in the filtrate. This corresponds to a yield of 9%.

Example 7

The same gypsum from example 6 pretreated according to step 1 was treated by a 2nd step in a further experiment. 4 g of the pretreated gypsum, in a 2nd step, was admixed with 40 ml (S/L=0.1) of a 10% NaCl solution and stirred at room temperature for 5 h. On completion, the filtrate from step 2 was separated off. In the 2nd step, a total amount of 4.39 mg of rare earths was found in the filtrate. This corresponds to a yield of 17.5%.

Example 8

The same gypsum from example 6 pretreated according to step 1 was treated by a 2nd step in a further experiment. 4 g of the pretreated gypsum, in a 2nd step, was admixed with 40 ml (S/L=0.1) of a 5% $NH_4NO_3$ solution and stirred at room temperature for 5 h. On completion, the filtrate from step 2 was separated off. In the 2nd step, a total amount of 4.03 mg of rare earths was found in the filtrate. This corresponds to a yield of 16.1%.

Example 9

The same gypsum from example 6 pretreated according to step 1 was treated by a 2nd step in a further experiment. 4 g of the pretreated gypsum, in a 2nd step, was admixed with 20 ml (S/L=0.1) of a 10% $NH_4NO_3$ solution and stirred at room temperature for 5 h. On completion, the filtrate from step 2 was separated off. In the 2nd step, a total amount of 4.40 mg of rare earths was found in the filtrate. This corresponds to a yield of 17.6%.

Example 10

The same gypsum from example 6 pretreated according to step 1 was treated by a 2nd step in a further experiment. 4 g of the pretreated gypsum, in a 2nd step, was admixed with 20 ml (S/L=0.2) of a 10% $NH_4NO_3$ solution and stirred at room temperature for 16 h. On completion, the filtrate from step 2 was separated off. In the 2nd step, a total amount of 7.26 mg of rare earths was found in the filtrate. This corresponds to a yield of 29.0%.

Example 11

In order to determine the efficiency with regard to the removal of radioactive constituents in the 1st step of the process described, the PG A gypsum pretreated according to example 1 after the 1st step, the original PG A gypsum and the collected filtrate after pretreatment were analyzed for thorium and uranium contents. In the original PG A gypsum, concentrations of 1.04 mg/kg and 10.0 mg/kg were found for thorium and uranium respectively, which, given the 75 g of gypsum used, corresponds to a total amount of 0.078 mg and 0.750 mg of thorium and uranium respectively. After pretreatment of the gypsum, both values were below the detection limit. In the filtrate (320.9 g), a concentration of 0.208 mg/kg and 1.71 mg/kg of thorium and uranium respectively was ascertained, which corresponds to a total amount of 0.067 mg and 0.549 mg of thorium and uranium respectively or to an efficiency of 85.8% and 72.8% respectively.

Example 12

In order to determine the efficiency with regard to the removal of heavy metals such as Pb in step 2 of the process described, the PG A gypsum pretreated according to example 2 after the 1st step, the original PG A gypsum and the filtrate after the 2nd step were analyzed with regard to the lead content. In the original PG A gypsum, concentrations of 6.94 mg/kg of lead were found. After pretreatment of the gypsum, the lead content was 7.56 mg/kg, which corresponds to 7.56 pg per g of treated gypsum. The increasing concentration in the treated gypsum is attributable to the virtually complete conversion of dihydrate to anhydrite and associated loss of water of crystallization in the treated gypsum. It was only possible to find traces of lead in the filtrate after the 1st step. In the filtrate from the 2nd step, a lead concentration of 0.71 mg/l was ascertained, which corresponds to a total amount of 7.1 µg of lead or an efficiency of 94.2%.

| List of reference numerals | |
|---|---|
| 1 | Processing unit for phosphate rock or phosphate ore |
| 2 | Reaction unit of the phosphoric acid plant |
| 3 | Filtration unit of the phosphoric acid plant |
| 4 | Sulfuric acid production plant (existing) |
| 5 | Calcium sulfate reaction unit |
| 6 | 1st calcium sulfate separation unit |
| 7 | Raw meal preparation unit |
| 8 | Cement clinker process unit |
| 9 | Sulfur dioxide offgas treatment |
| 10 | Calcium sulfate from stockpile (from phosphoric acid production) |
| 11 | Recovery of rare earths from calcium sulfate |
| 12 | Calcium sulfate separation unit |
| 13 | Sulfuric acid production plant (new) |
| 14 | Calcium sulfate/rare earth recovery unit |
| 15 | 2nd calcium sulfate separation unit |

What is claimed is:

1. An integrated process for producing sulfuric acid and cement clinker and for obtaining rare earths, the process comprising performing the following steps in an integrated plant complex:
   (a) treating calcium sulfate separated from phosphoric acid in step (f) with an acid to obtain a suspension comprising purified calcium sulfate;
   (b) separating the purified calcium sulfate in solid form from a liquid phase of the suspension, wherein the purified calcium sulfate that is separated off contains at least 50% by weight of anhydrite based on dry calcium sulfate,
   (b1) treating the purified calcium sulfate that is separated in step (b) with water or with a salt- and/or chelate ligand-containing aqueous solution to leach rare earths out of the calcium sulfate, wherein a weight ratio of solids to liquid for the leaching of the rare earths is 1:1 to 1:10, wherein a dwell time for the leaching of the rare earths is 5 h to 68 h,
   (b2) separating the further-purified calcium sulfate from step (b1) in solid form from a liquid phase of a suspension obtained in step (b1) with one or more rare earths present in the liquid phase;

(c) mixing the further-purified calcium sulfate that is separated off in step (b1) with admixtures and reducing agents to obtain a raw meal mixture for cement clinker production;

(d) burning the raw meal mixture to obtain the cement clinker, forming sulfur dioxide as offgas;

(e) feeding the sulfur dioxide as raw material to sulfuric acid production to produce the sulfuric acid; and (f) forming the calcium sulfate and separating the calcium sulfate off as a solid by-product during production of the phosphoric acid in a reaction of raw phosphate with the sulfuric acid to form the phosphoric acid.

2. The process of claim 1 wherein the calcium sulfate used in step (a) is calcium sulfate obtained from a separation unit in the phosphoric acid production directly or after one or more washes with liquid.

3. The process of claim 1 wherein at least one of:

in step (a) the acid is added such that a weight ratio of solids to liquid in the suspension in step (a) is in a range from 1:10 to 1:1;

an acid resulting from the treatment in step (a) is a 1 to 12 molar acid;

the acid used in step (a) is hydrochloric acid, nitric acid, sulfurous acid, and/or sulfuric acid;

the treatment in step (a) is conducted at a temperature in a range from 15 to 100° C.; and a duration of the treatment in step (a) is in a range from 5 to 120 minutes.

4. The process of claim 1 wherein a $D_v(50)$ of a grain size distribution of the separated, purified calcium sulfate obtained in step (b) is in a range of 0.5-100 μm.

5. The process of claim 1 wherein the aqueous solution used for leaching in step (b1) comprises a salt and/or chelate ligand in a concentration of 1% to 50% by weight.

6. The process of claim 1 wherein at least one of:

the salt used for leaching in step (b1) comprises a chloride and/or a nitrate; or the chelate ligand-containing aqueous solution comprises EDTA and/or citrate.

7. The process of claim 1 wherein a reaction mixture in step (b1) is kept in motion during a reaction time by circulating, stirring, or blowing in gas.

8. The process of claim 1 wherein the weight ratio of solids to liquid for the leaching in step (b1) is in a range from 1:2 to 1:5.

9. The process of claim 1 wherein the separation of the further-purified calcium sulfate in solid form from the liquid phase comprising one or more rare earths in step (b2) comprises a centrifugation, a filtration, a sedimentation, and/or an evaporation of the liquid phase.

10. The process of claim 1 comprising obtaining rare earths by way of solvent-solvent extraction, ion exchange methods, precipitation as hydroxides, oxalates, phosphates, and/or carbonates, from the solution comprising one or more rare earths obtained in step (b2).

11. The process of claim 1 wherein the admixtures for production of the raw meal mixture in step (c) are raw materials or compounds comprising one or more oxides selected from oxides of Si, Al, Fe, Ca, or precursors thereof.

12. The process of claim 11 wherein carbon, hydrocarbons, and/or elemental sulfur is mixed into the calcium sulfate as a reducing agent.

13. The process of claim 1 wherein carbon, hydrocarbons, and/or elemental sulfur is mixed into the calcium sulfate as a reducing agent.

14. The process of claim 1 wherein an extent of purification of the calcium sulfate in step (a) is established taking account of impurities present in the admixtures used for the raw meal mixture, wherein guide values for phosphorus and fluorine are observed for the cement clinker.

15. The process of claim 14 wherein a liquid budget of the phosphoric acid production is not altered by the integrated process because input of liquid for purification of the calcium sulfate in the integrated process is coupled to the liquid budget of the phosphoric acid production.

16. The process of claim 14 wherein the guide value for phosphorus is not more than 1.0% by weight of $P_2O_5$ and the guide value for fluorine is not more than 0.5% by weight of F.

17. The process of claim 14 wherein the guide value for phosphorus is not more than 0.5% by weight of $P_2O_5$ and the guide value for fluorine is not more than 0.25% by weight of F.

18. The process of claim 14 wherein the guide value for phosphorus is not more than 0.1% by weight of $P_2O_5$ and the guide value for fluorine is not more than 0.1% by weight of F.

* * * * *